US007181762B2

(12) United States Patent
Jerdonek (10) Patent No.: US 7,181,762 B2
(45) Date of Patent: *Feb. 20, 2007

(54) APPARATUS FOR PRE-AUTHENTICATION OF USERS USING ONE-TIME PASSWORDS

(75) Inventor: Robert A. Jerdonek, Sunnyvale, CA (US)

(73) Assignee: Arcot Systems, Inc., Santa Clara, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 09/896,163

(22) Filed: Jun. 28, 2001

(65) Prior Publication Data

US 2002/0095569 A1 Jul. 18, 2002

Related U.S. Application Data

(60) Provisional application No. 60/262,875, filed on Jan. 17, 2001.

(51) Int. Cl.
G06F 1/26 (2006.01)

(52) U.S. Cl. .......................................................... 726/2

(58) Field of Classification Search ................ 713/153, 713/200, 202, 155; 380/124, 278; 726/9, 726/2

See application file for complete search history.

(56) References Cited

U.S. PATENT DOCUMENTS

| 5,668,876 | A | | 9/1997 | Falk et al. | |
|---|---|---|---|---|---|
| 6,058,480 | A | | 5/2000 | Brown | |
| 6,148,404 | A | * | 11/2000 | Yatsukawa | 726/2 |
| 6,715,082 | B1 | * | 3/2004 | Chang et al. | 713/201 |
| 6,732,269 | B1 | * | 5/2004 | Baskey et al. | 713/153 |
| 6,782,103 | B1 | * | 8/2004 | Arthan et al. | 380/278 |
| 6,952,781 | B1 | * | 10/2005 | Chang et al. | 713/160 |

FOREIGN PATENT DOCUMENTS

WO WO 01/17310 A1 3/2001

* cited by examiner

Primary Examiner—Nasser Moazzami
Assistant Examiner—Ellen C. Tran
(74) Attorney, Agent, or Firm—Townsend and Townsend and Crew LLP (57) ABSTRACT

A computer program product for a client computing system including a processor includes code that directs the processor to request a challenge from a authentication server, code that directs the processor to receive the challenge from the authentication server via a first secure communications channel, the challenge comprising an identity code, code that directs the processor to receive user authentication data from a user, code that directs the processor to determine a private key and a digital certificate in response to the user authentication data, code that directs the processor to form a digital signature in response to the identity code and the private key, code that directs the processor to communicate the digital signature to the authentication server, code that directs the processor to communicate the digital certificate to the authentication server, the digital certificate comprising a public key in an encrypted form, and code that directs the processor to communicate network user authentication data and the identity code to the authentication server via a security server, wherein the authentication server activates the identity code when the digital signature is verified, and wherein the codes reside on a tangible media.

20 Claims, 8 Drawing Sheets

APPARATUS FOR PRE-AUTHENTICATION OF USERS USING ONE-TIME PASSWORDS

CROSS-REFERENCES TO RELATED APPLICATIONS

The present invention disclosure claims priority to Provisional U.S. Patent Application No. 60/262,875, filed Jan. 17, 2001, entitled Method and Apparatus for Pre-Authentication of Users Using One-Time Passwords. This application is herein by incorporated by reference for all purposes.

This application is related to U.S. patent application Ser. No. 09/896,560, filed on Jun. 28, 2001 and entitled "Methods for pre-authentication of users using one-time passwords," now U.S. Pat. No. 6,983,381.

BACKGROUND OF THE INVENTION

The present invention relates to secure computer network access. In particular, the present invention relates to methods and apparatus for issuing and using one-time passwords for secure computer networks.

Secure remote access to computer networks requires the end user to be authenticated before the end user is granted access to the network. In current secure remote access systems, the end user is authenticated using a variety of methods. In one method, when the end user accesses a remote server, the end user is prompted for a combination of user name or login name, password, personal identification number ("PIN"), and the like. Upon verification that the user login name and PIN are registered, the end-user is granted access to a computer network.

Drawbacks to this scheme include that once the user name and password is compromised or stolen, unauthorized access to the computer system can easily occur. Another drawback includes that simple password guessing strategies can be used to guess a password.

Another method for restricting user access to a computer system has been through the use of electronic "key cards" or "tokens." In such solutions, users are typically issued a physical hardware device or software that allows users to enter data therein. In response to such user data, these devices output passwords, or the like that are subsequently used for a login attempt.

Drawbacks to such devices include that it is very easy to misplace or lose such hardware devices. Another drawback is that kids, pets, or the like may tamper with such "toys" to render them inoperative. Yet another drawback is that in such systems, system administrators need to manually pre-register the key cards, before the key cards will work. Still another drawback is that if the hardware device is stolen, or the like, the thief will then possess the requisite electronic identification to access the computer network.

Another drawback is that such systems rely on precise time synchronization between such "keycards" or "tokens" and the server machine. This is often difficult to perform and difficult to maintain because of clock drifts in the various devices.

Thus in light of the above, what is needed in the industry are improved methods and apparatus for issuing and using one-time passwords for computer networks, while reducing the drawbacks discussed above.

SUMMARY OF THE INVENTION

The present invention relates to methods and apparatus for securely obtaining and using one-time passwords. Embodiments of the present invention may be applied to firewalls, VPN Gateways, Electronic Mail servers, web servers, database systems, application servers, wireless applications, secure distributed services access, embedded applications, and the like. Embodiments may advantageously be applied to currently deployed computer systems that include a firewall, a VPN Gateway or the like, without modification thereof.

Embodiments include methods and apparatus wherein a verification server (authentication server) sends a one-time password to a user as a challenge via an external server. The communication between the verification server, external server, and the users client system uses "strong" forms of encryption itself, such as IPSec, SSL, S-HTTP or the like. The verification server then receives a challenge response. In one embodiment, the challenge response includes a digital signature. In one embodiment, the challenge response also includes a digital certificate including the public key in encrypted form. In other embodiments, other forms of encryption other than using key pairs may also be used.

Once the verification (authentication) server verifies the user, via the digital signature and digital certificate, the verification server pre-authenticates or activates the one-time password. The user may then sign-on using the password-based security system using a user identification and the one-time password. Because the one-time password has been pre-authenticated or activated by the verification server, the password-based security system will approve the connection. As described in the attached documents, time limits may be set within the verification server such that if a login attempt is not made within a period of time after activating the one-time password, the one-time password is unauthorized, deleted, inactivated, or the like.

According to one aspect of the invention, a computer program product for a client computing system including a processor is disclosed. The computer program product includes a tangible media. The tangible media may include code that directs the processor to request a challenge from an authentication server, code that directs the processor to receive the challenge from the authentication server via a first secure communications channel, the challenge comprising an identity code, code that directs the processor to receive user authentication data from a user, and code that directs the processor to determine a private key and a digital certificate in response to the user authentication data. Additionally, the tangible memory may include code that directs the processor to form a digital signature in response to the identity code and the private key, code that directs the processor to communicate the digital signature to the authentication server, code that directs the processor to communicate the digital certificate to the authentication server, the digital certificate comprising a public key in an encrypted form, and code that directs the processor to communicate network user authentication data and the identity code to the authentication server via a security server. In one embodiment, the authentication server activates the identity code when the digital signature is verified According to another aspect of the invention, a client computing system for communicating with a private server is disclosed. The client computer system may include a tangible memory configured to store a key wallet, the key wallet including a private key associated with the user and a digital certificate associated with a user, the private key and digital certificate stored in an encrypted form, and a processor coupled to the tangible memory, the processor configured to receive a challenge from an authentication server via a first secure communications channel, the challenge comprising an identity code, configured to receive user authentication data from the user, configured to determine a retrieved private key and a retrieved digital certificate from the key wallet in response to the user authentication data from the user; configured to form a digital signature in response to the identity code and the retrieved private key, configured to communicate the digital signature to the authentication server, configured to communicate the digital certificate to the authentication server, and configured to communicate network user authentication data and the identity code to the authentication server via a security server. In one client computing system the authentication server activates the identity code when the digital signature is verified, and the security server allows the client computing system to communicate with the private server when the identity code is activated.

According to yet another aspect of the invention, a client system for communicating with a remote server is disclosed. The client system may include a tangible memory configured to store key wallet program, the key wallet program configured to store a private key associated with the user and a digital certificate associated with a user in encrypted forms, means for receiving a challenge from a verification server via a first secure communications channel, the challenge comprising at least a network password that is inactive, and means for receiving at least a PIN from the user. Additional client systems may also include means coupled to the tangible memory for determining a returned private key and a returned digital certificate from the key wallet in response to at least the PIN from the user, means for forming a digital signature in response to the network password and to the private key, means for communicating the digital certificate and the digital signature to the authentication server, and means for communicating at least the network password to a security server. In one client system the network password is activated when the digital signature and digital certificate authenticate the user, and the security server allows the client system to communicate with the remote server when the network password is activated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE SPECIFIC EMBODIMENTS

The attached documents describe embodiments of the present invention. More specifically, the documents describe embodiments where "strong" forms of encryption, such as public key cryptography, are used to obtain one-time passwords. Such passwords may be advantageously used by conventional password-based security systems, or the like.

Figure 1:
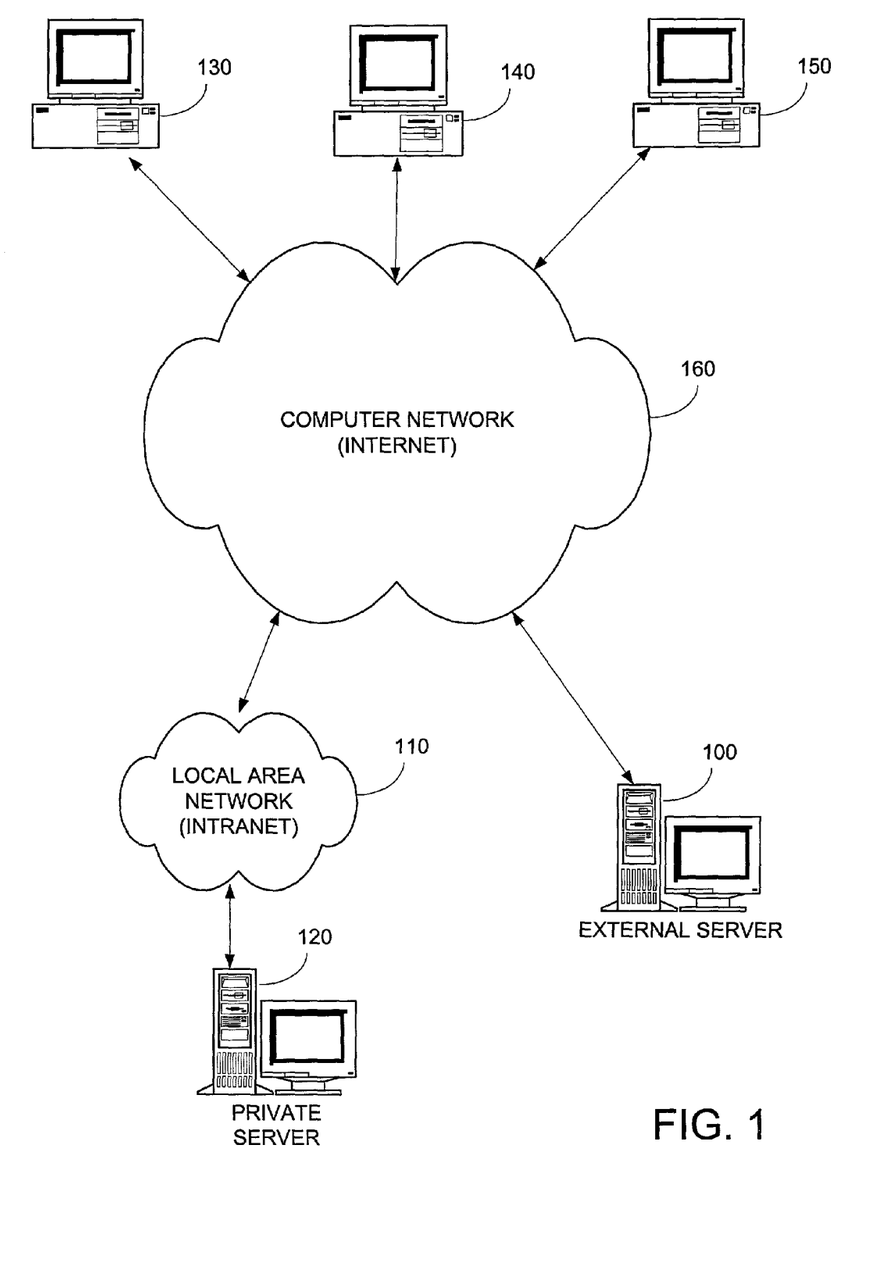
FIG. 1 illustrates a block diagram according to an embodiment of the present invention.

FIG. 1 illustrates a block diagram according to an embodiment of the present invention. FIG. 1 illustrates a external server 100, a private computer network 110, a private server 120, and plurality of client systems 130–150. As illustrated, such systems may be coupled to each other via a computer network 160.

In the present embodiment, computer network 160 is the Internet. In alternative embodiments of the present invention, computer network 160 may be any computer network, such as an intranet, a wireless network, a local area network, an internet, and the like. Computer network 160 provides data communication among client systems 130–150, external server 100, and private company network 110. Data communication may include transfer of HTML based data, textual data, binary data, form submissions, plug-in programs or viewers, applets, audio data, video data, encrypted data, and the like. Although computer network 160 is illustrated as a single entity, as is the case with the Internet, it should be understood that computer network 160 may actually be a network of individual routers and computer servers.

In this example, external server 100, private computer network 110, and client system 130–150 may include network connections that may have varying bandwidth characteristics, such as T1 connections, 384 kilobits per second (kbps), 56 kbps connections, 14.4 kbps, and the like.

In the present embodiment, client systems 130, 140, and 150 may embodied as typical desktop personal computers such as those available from companies such as HP, Compaq, IBM, and the like. In alternative embodiments, other personal computers such as those available from Apple or Dell, may also be used. Alternatively, client systems 130–150 may be embodied as notebook computers, television set top boxes, (e.g. WebTV™), game consoles (e.g. PlayStation2™), network computers, or other types of units incorporating processors, microcontrollers, ASICs, and the like. In other embodiments, client systems 130–150 may be embodied as PDAs or other portable computing platforms operating upon PalmOS, WindowsCE, and the like, or embodied as wireless devices using cellular technology, CDMA, TDMA, and other technologies, and using wireless application protocols such as WAP. In still other examples, client systems 130–150 may be embodied within kiosks, wrist watches, pocket or portable displays or terminals, wearable computers, retinal implants, surveillance equipment, kitchen appliances, and the like.

In the present embodiment, communications among external server 100, private computer network 110, private server 120, and client systems 130–150 are performed using application software that supports secure-IPSec, HTTP (S-HTTP), TCP/IP, Secure Socket Layer (SSL) protocols, RTP/RTSP protocols, or other protocols, such as UDP. These communication protocols are well known, thus no description is given herein. Additionally, client systems 130–150 store and use encrypted public/private key pairs associated with authorized users, as will be described below.

The diagram in FIG. 1 is merely an illustration which should not limit the scope of the claims herein. One of ordinary skill in the art would recognize many other variations, modifications, and alternatives.

Figure 2:
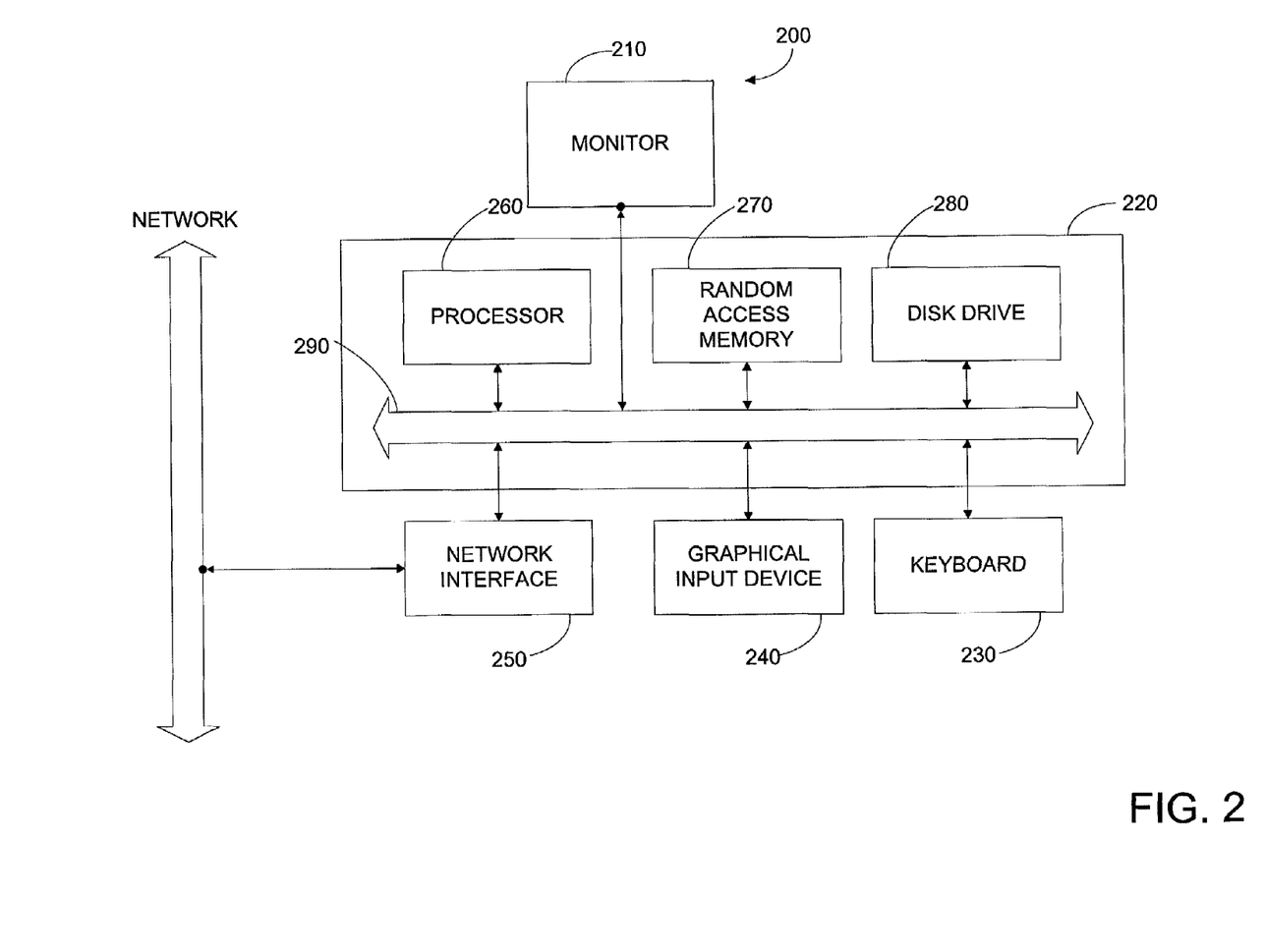
FIG. 2 is a block diagram of a typical external server according to an embodiment of the present invention.

FIG. 2 is a block diagram of a typical external server 200 according to an embodiment of the present invention. External server 200 typically includes a monitor 210, a computer 220, a keyboard 230, a graphical input device 240, a network interface 250, and the like.

In the present embodiment, graphical input device 240 is typically embodied as a computer mouse, a trackball, a track pad, wireless remote, and the like. Graphical input devices typically allow the users to graphically select objects, icons, text and the like output on monitor 210 in combination with a cursor.

Embodiments of network interface 250 include an Ethernet card, a modem (telephone, satellite, cable, ISDN), (asynchronous) digital subscriber line (DSL) units, and the like. Network interface 250 is coupled to a typical network as shown.

Computer 220 includes familiar computer components such as a processor 260, and memory storage devices, such as a random access memory (RAM) 270, a disk drive 280, and a system bus 290 interconnecting the above components.

In one embodiment, computer 220 is a PC compatible computer having an x86 based microprocessor, such as an Athlon™ microprocessor from Advanced Micro Devices, Inc. running WindowsNT™ operating system from Microsoft Corporation.

RAM 270 and disk drive 280 are examples of tangible media for storage of data, audio message files, computer programs, embodiments of the herein described invention, binary files, encrypted data, applet interpreters or compilers, virtual machines, and the like. Other types of tangible media include floppy disks, removable hard disks, optical storage media such as CD-ROMS and bar codes, semiconductor memories such as flash memories, read-only-memories (ROMS), and battery-backed volatile memories, and the like. In embodiments of the present invention such as set top boxes, mass storage, such as disk drive 280, and the like may be dispensed with.

In the present embodiment, external server 200 also includes software that enables it to send and receive data to and from client systems 130–140 and private computer network 110 using communications protocols including, HTTP, S-HTTP, TCP/IP, IPSec, SSL, RTP/RTSP and the like. In alternative embodiments of the present invention, other software and transfer and communication protocols may also be used, for example IPX, UDP or the like.

FIG. 2 is representative of but one type of system for embodying the present invention. It will be readily apparent to one of ordinary skill in the art that many other hardware and software configurations are suitable for use with the present invention. For example, other types of processors are contemplated, such as the Pentium™-class or Celeron™-class microprocessors from Intel Corporation, PowerPC™ G3 or G4 microprocessors from Motorola, Inc., Crusoe™ processors from Transmeta, Inc. and the like. Further, other types of operating systems are contemplated in alternative embodiments including Solaris, LINUX, UNIX, MAC OS X from Apple Computer Corporation, BeOS™, and the like. Embodiments of private server 120 and client systems 130–150 may be configured similar to that shown in FIG. 2.

Figure 3:
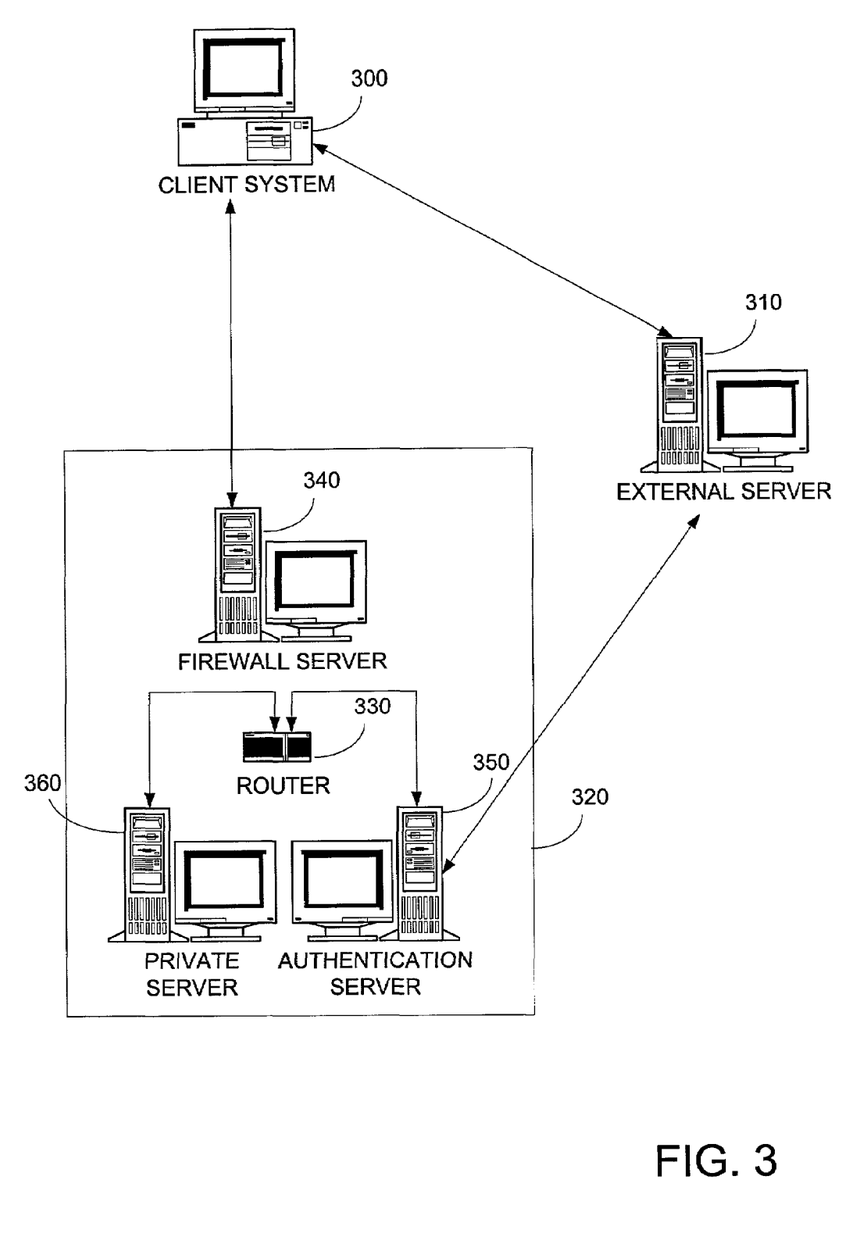
FIG. 3 illustrates a more detailed embodiment of the present invention.

FIG. 3 illustrates a more detailed embodiment of the present invention. In particular, FIG. 3 includes a client system 300, an external server 310, and a private network 320. Private network 320 includes a firewall (or VPN) server 340, an authentication server 350, and a private server 360 coupled via a router 330.

In this embodiment, client system 300 is coupled to both external server 310 and private network 320 often at different times, as will be described in greater detail below. As shown, firewall server 340 within private network 320 provides an interface for client system 300. In this embodiment, firewall server 340 in combination with authentication server 350 are used to authenticate the user at client system 300. Further, the combination is typically used to prevent unauthorized access to private server 360.

FIGS. 4A–D illustrate block diagrams of a flow chart according to an embodiment of the present invention with reference to the elements shown in FIG. 3.

Figure 4A:
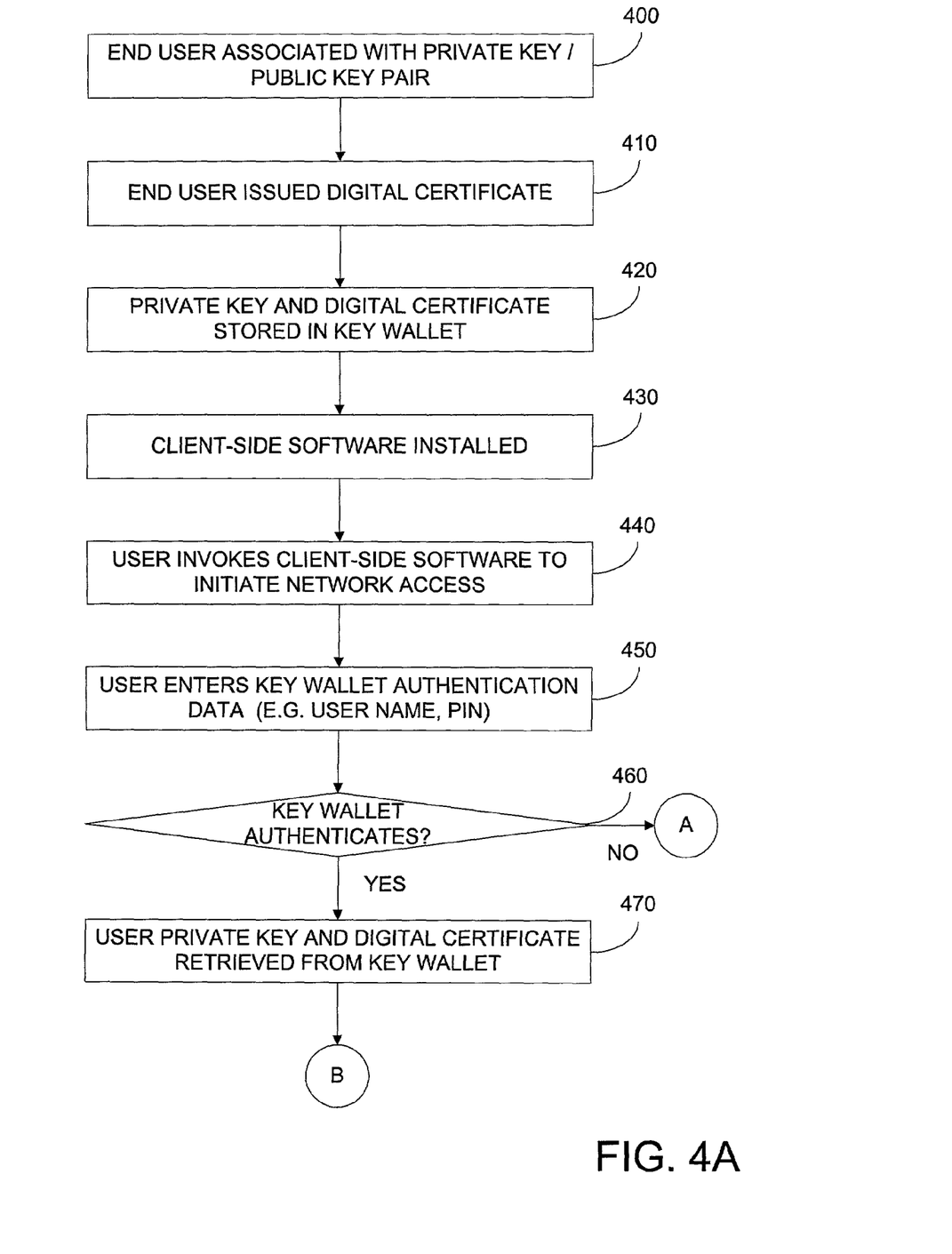
FIGS. 4A–D illustrate block diagrams of a flow chart according to an embodiment of the present invention.
Figure 4B:
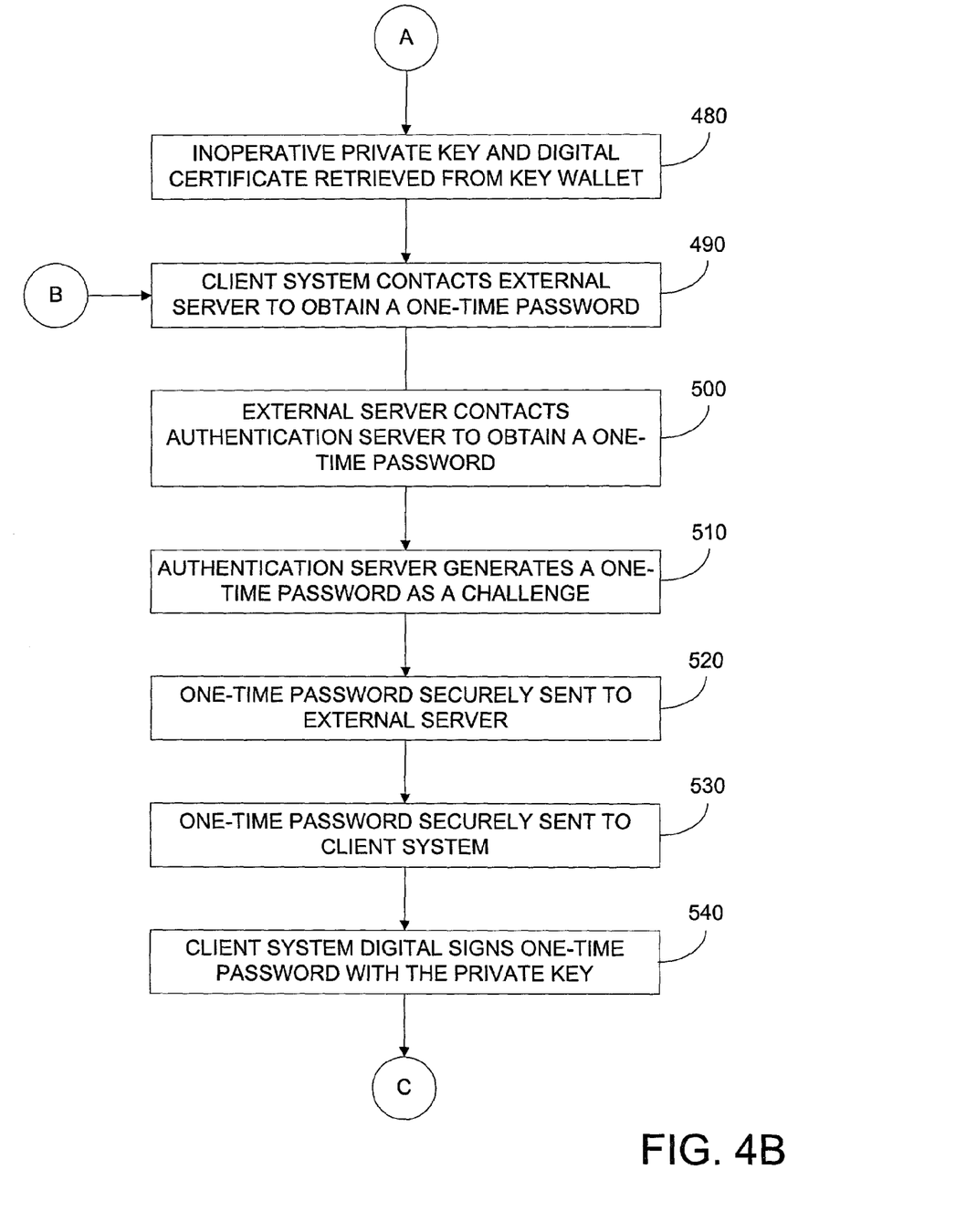
Figure 4C:
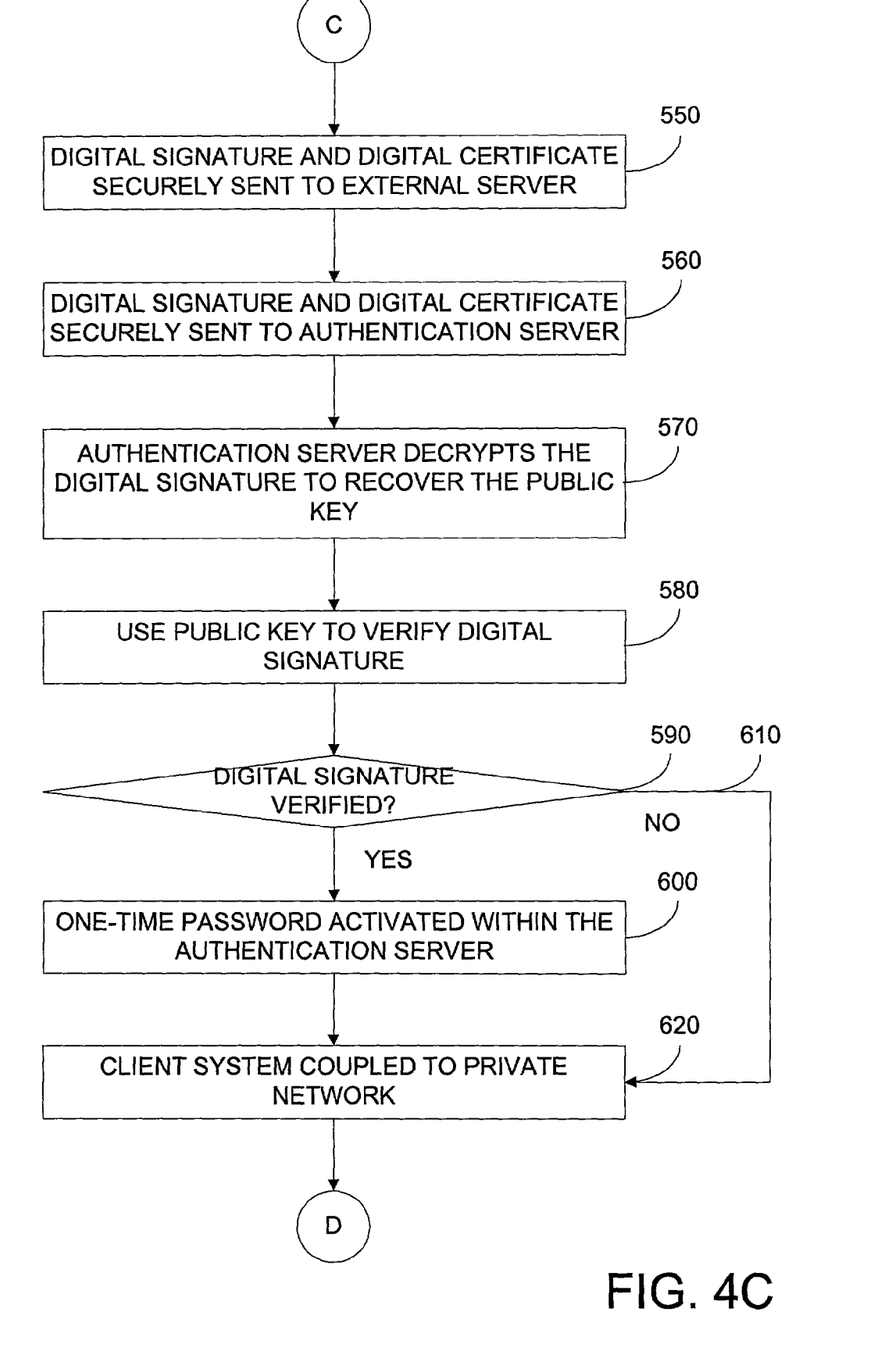
Figure 4D:
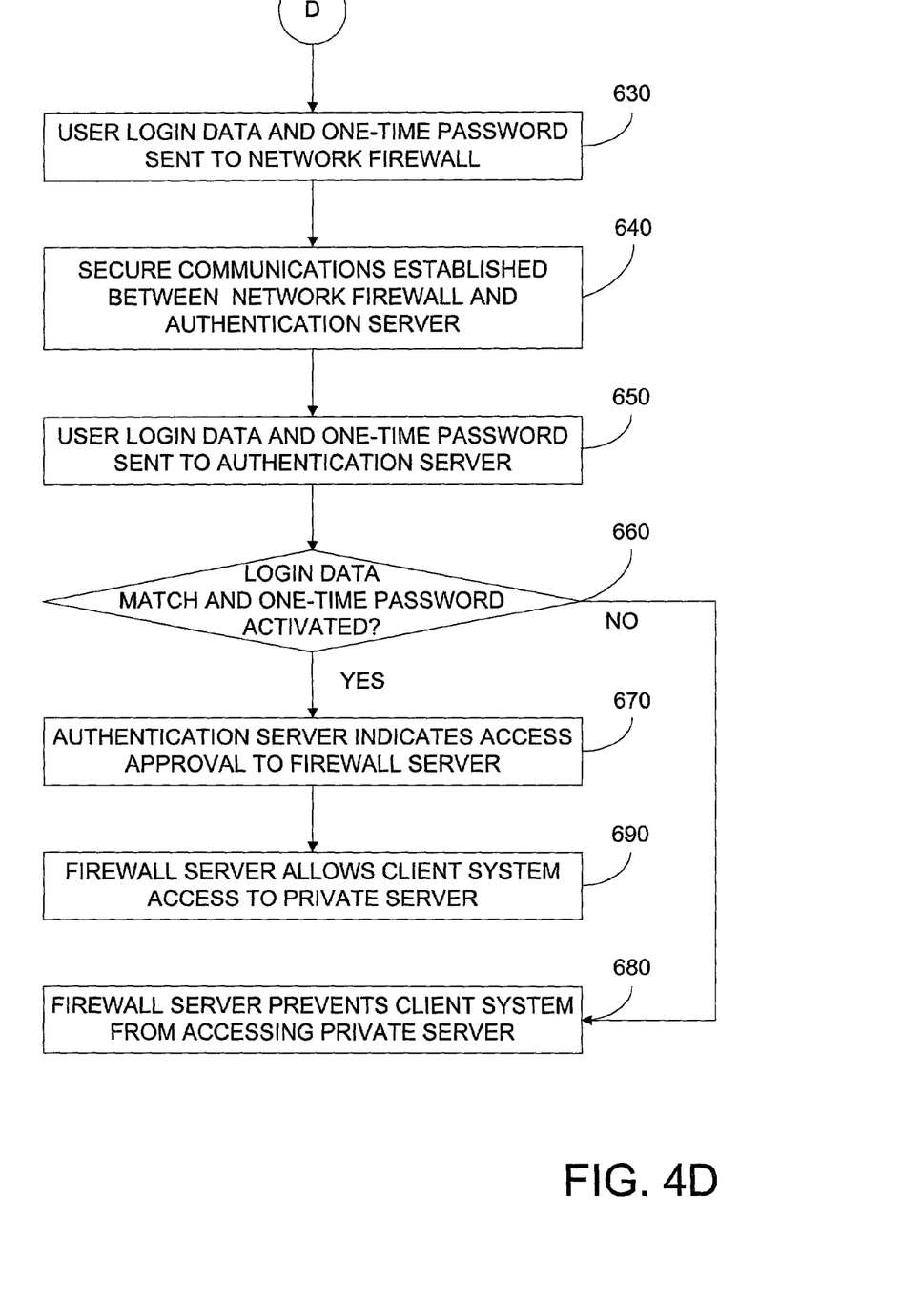

Initially, a user receives or establishes an asymmetric encryption key pair, step 400. For example, the user may have been assigned or may have obtained a private key and a public key. The concepts of key pairs are well known in the industry. Next, the user obtains a digital certificate from a certificate authority (CA) or the like, step 410. In one embodiment, the digital certificate comprises a user's public key encrypted with the CA's "domain key" (typically a symmetric key). The user's private key and digital certificate are then typically stored in a "key wallet" on the user's computer, step 420.

In one embodiment of the present invention, the key wallet is a software application that securely stores the private key and the digital certificate. In one embodiment, to retrieve the private key and digital certificate from the key wallet, the user has to first enter one or more user name and a personal identification number (PIN), or the like. In one case, when the user name/PIN combination is correct, the key and digital certificate associated with the user is returned.

In other embodiments, the key wallet may return keys and certificates that are not associated with the user. In such an example, the keys and digital certificates appear to be valid, but they are inoperative to authenticate the user. Such embodiments include Arcot Systems brand "Cryptographic Camouflage" key protection system as described in the U.S. application Ser. No. 08/996,758, titled Method and Apparatus for Cryptographically Camouflaged Cryptographic Key Storage, Certification and Use, filed Dec. 23, 1997, and assigned to the same assignee. This application is incorporated by reference for all purposes.

In other embodiments, the key wallet may require other types of data than user names/passwords, for example, biometric data may be used. Examples of biometric data include fingerprints, retina scans, spoken text, execution of physical tasks, and the like.

In this embodiment, the user's computer may include additional software that may provide automatic use of the private key and digital certificate. One such embodiment of the additional software is called Arcot for Virtual Private Networks presently available from Arcot Systems, Inc. In an embodiment of the present invention, the additional software is downloaded from a computer network, or installed via physical media (CD-ROM), or the like, step 430.

Referring to FIG. 3, the user at client system 300 next wants to access private server 360, step 440. The user enters their user name, PIN, biometric data, and the like to authenticate themselves, step 450. If such data are valid, i.e. the user is authenticated, step 460, the key wallet decrypts data and retrieves the private key and the digital certificate associated with the user, step 470. If the data are invalid, an inoperative key and certificate may be generated as discussed in the above U.S. patent application, step 480.

In this example, the application software in client system 300 contacts external server 310 to request a one-time password (or any other identification code), step 490. The connection between client system 300 and external server 310 may be via the Internet, via a direct dial-up connection, or any other means including wireless. This connection is typically a secure connection including encryption of data between client system 300 and external server 310, such as IPSec, S-HTTP, SSL, or the like.

In response to the request, external server 310 contacts an authentication server 350 and requests a one-time password, step 500. The connection between external server 310 and authentication server 350 may be via the Internet, via a direct dial-up connection, or any other means including wireless. This connection is also typically a secure connection including strong forms of encryption of data between client system 300 and external server 310, such as IPSec, S-HTTP, SSL, or the like. In one embodiment, communications between external server 310 and authentication server 350 may be direct, or indirect, for example via firewall server 340.

Authentication server 350 next generates a one-time password (also known as a pre-authorized password) in response to the request, step 510. In this embodiment, the one-time password is not activated, i.e. authentication server 350 will not allow access to private server 360 based upon the one-time password.

The one-time password is then communicated to external server 310, step 520, and external server 310 then communicates it to client system 300, step 530. This one-time password may be considered a "challenge" from authentication server 350 to client system 300.

In the present embodiment, the additional software in client system 300 receives the one-time password, and creates a digital signature, step 540. In one embodiment, the digital signature is a virtually unforgable transformation of the one-time password with the private key. In other embodiments, other conventional methods for forming digital signatures may be used such as using hashing.

Next, client system 300 sends the digital signature and digital certificate to external server 310, step 550. As above, the transfer of data typically is via a secure communications channel. The digital signature and digital certificate are then communicated to authentication server 350, step 560. Again, strong forms of encryption may be used to protect the communication. This response from client system 300 may be considered a "challenge response" to authentication server 350.

In this embodiment, authentication server 350 receives the digital certificate, and decrypts it using the Certification Authority's (CA's) domain key, step 570. In one embodiment, the authentication server stores the domain key securely on the authentication server machine. The domain key can be stored on the authentication server in a password-protected file, a hardware token, or the like. In an alternative embodiment, authentication server 350 accesses the appropriate CA that issued the digital certificate for the domain key. In either embodiment, authentication server 350 then uses the CA's domain key and uses it to decrypt the digital certificate. In response to the decryption, the public key of the user is recovered.

The public key is used to verify the digital signature to confirm that only the user with the corresponding private key could have possible produced the digital signature, step 580. This step is a standard operation supported by algorithms such as RSA.

In this embodiment, the verification confirms the identity of the user who created the signature, step 590. If the digital signature is verified, the challenge is activated for that specific user and the challenge becomes the one-time-password within authentication server 350, step 600. If they do not match, the one-time password remains inactive, step 610.

The present method therefore does not require authentication server 350 or external server 310 to pre-register a hardware "key" or "token" as was discussed in the background. Further, it does not require precise synchronization between devices, as was also discussed in the background.

In one embodiment, notification of the success or failure of the digital signature match, such as an error message is sent back to client system 300. Further, if the digital signature is not verified, the process may alternatively return back to step 450.

In one embodiment, the challenge provided by authentication server 250 is not the one-time password, instead, the challenge may be any random or pseudo random message, characters, or the like. The challenge is digitally signed and sent back to authentication server 350 as described above. If the user is authenticated, authentication server 350 may then send an activated one-time password to client system 300 via external server 310 using the same secure communications channels.

In either embodiment, after successful authentication, at this stage, client system 300 has an activated one-time password. Next, client system 300 is coupled to network 320, step 620. The communications channel is typically encrypted using IPSec, S-HTTP, SSL, or the like. As shown, private network 320 typically includes a firewall server 340 to prevent unauthorized access to private server 360.

In this embodiment, client system 300 transfers authorization data to firewall server 340, step 630. In this example, the authorization data may include another user name and password combination, as well as the one-time password received from authentication server 350.

In response, firewall server 340 contacts authentication server 350, step 640. In the present embodiment, communications between firewall server 340 and authentication server 350 may be using secure techniques such as Remote Authentication Dial In User Service (RADIUS), TACACS+ or the like. Firewall server 340 then communicates the authorization data and one-time password to authentication server 350, step 650. In this embodiment, authentication server 350 determines whether the one-time password is active and the authorization data is correct, step 660. If matches are made, authentication server 350 notifies the firewall server that access is approved, step 670, otherwise access is denied, step 680.

If the access is approved, client system 300 is provided access to private server 360, and the like, step 690. In one example, after the one-time password has been successfully used, the one-time password is de-activated. In other embodiments, the passwords remain active even after being used by authentication server 350. Such an embodiment would be a method for providing accesses and assigning passwords to "new" users or giving passwords to users during "initial" visits.

In one embodiment of the present invention, many of the steps are hidden from the user and may be automatic. In one example, the user performs step 450 and then simply waits until steps 680 or step 690 are performed. In this example, the steps 620 and 630 are automatically performed for the user. In another embodiment, after step 600, the secure communications between client system 300 and authentication server 350 is terminated. The user then manually performs steps 620 and 630.

Figure 5A:
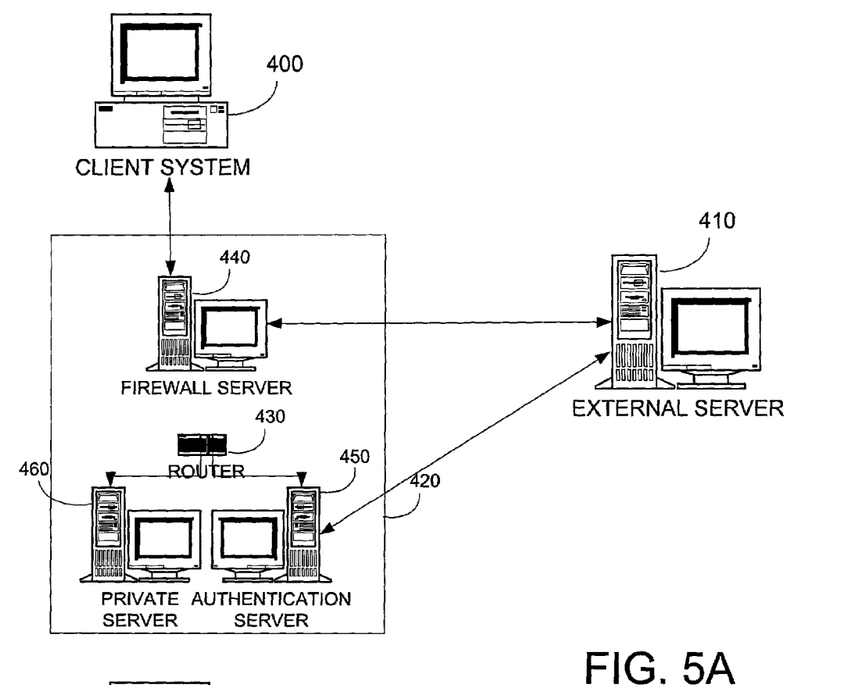
FIGS. 5A and B illustrate other embodiments of the present invention.

FIGS. 5A and B illustrate other embodiments of the present invention. In particular, FIGS. 5A and 5B illustrate other schemas for communication among a client system, an external server, and authentication server.

In one embodiment, as illustrated in FIG. 5A, a client system 400 does not contact external server 310 directly. Instead, as shown, a filtering module 470 is installed into firewall server 440. When filtering module 470 detects a request from client system 400 for a one-time password, filtering module 470 re-directs the request to external server 410.

Figure 5B:
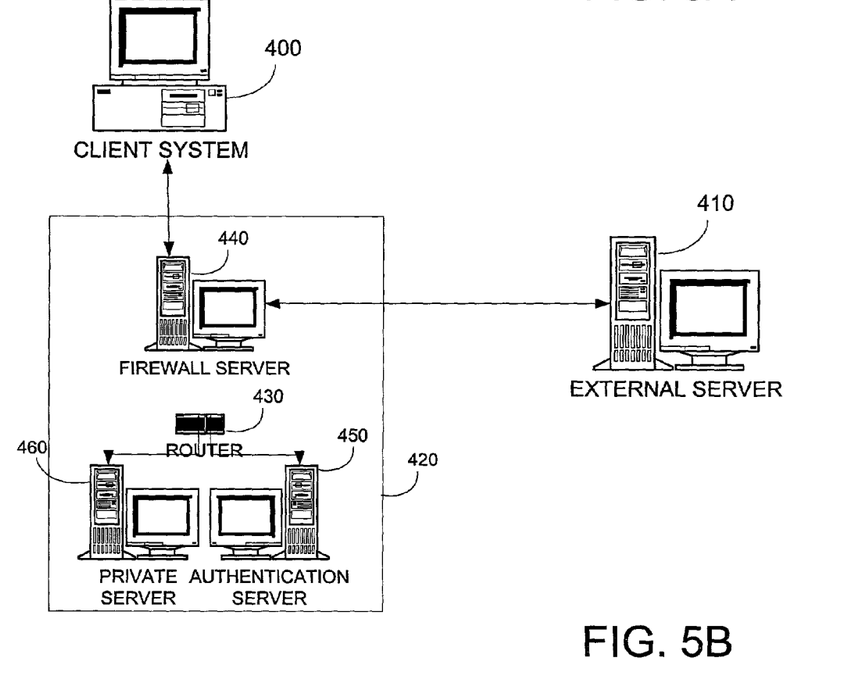

In an embodiment illustrated in FIG. 5B, external server 310 does not directly contact authentication server 350. Instead, as shown, communications are channeled through firewall server 440.

Further embodiments can be envisioned to one of ordinary skill in the art. For example, in one embodiment, the password-based security system may be integrated into a firewall, VPN or the like. In another embodiment the external server communicates with the verification server without passing through a firewall, or the like. In another case, the external server and the verification server are both behind a firewall, VPN, or the like. In yet another embodiment, the verification server and the firewall may be integrated into one server.

In one embodiment of the present invention, authentication server 350 may send a one-time password and a challenge. In such an embodiment, the challenge may be digitally signed and returned to authentication server 350 along with the digital certificate for verification purposes. If the user is verified, authentication server 350 activates the one-time password. Thus, in this embodiment, the one-time password need not be digitally signed as described in the above disclosure.

In one embodiment of the present invention, activation of the one-time passwords may be time limited. Thus although the one-time password and the authorization data may be correct, authentication server 350 may still deny access to the network. As an example, when authentication server issues a one-time password, it sets a maximum period of time that the one-time password is active, e.g. 5 minutes. Accordingly, if the user at client system 300 tries to gain access to private network 320 the next day, their access would be denied.

In still another embodiment, the one-time passwords may be active for only a limited number of login attempts. Thus although the one-time password and the authorization data may be correct, authentication server 350 may still deny access to the network. As an example, when authentication server issues a one-time password, it sets a maximum number of tries, e.g. 3 tries. Accordingly, if the user at client system 300 tries to gain access to private network 320 using the incorrect user name and password, but the correct one-time password, after the third try, the one-time password is deactivated. By providing such use-limited one-time passwords, it is believed the risks of network access compromise are reduced.

In light of the present patent application disclosure, embodiments of the present invention may be applied to financial transactions, such as credit card transaction systems, or the like. For example, one-time credit card numbers, one-time debit card numbers, or the like may be enabled in much the same manner as described above for one-time passwords. Accordingly, a client may first make a request for a one-time credit card number. In response, a credit-card authentication server may issue a challenge in the form of a one-time credit card number via an external server. The client signs the one-time credit card number with the user's private key and transmits the signed card number with the user's digital certificate. If the authentication server verifies that the signature and certificate, the one-time credit card number is activated. Later, when the user decides to pay for a product, service, or the like, the user submits the one-time credit card number. If verified above, the financial transaction is completed using the one-time credit card number. In other embodiments, other financial transaction data may be provided by the authentication server, for example, one-time bank account number, brokerage account number, telephone access card, and the like.

In one embodiment of the present invention, the client system may include a level of key wallet password checking. In the embodiment illustrated above, if a user enters an incorrect key wallet password, an inoperative private key and digital certificate are retrieved from the key wallet in step 480. In this embodiment, for an incorrect key wallet password, the key wallet application may report that the password is incorrect, and the method goes back to step 450. Such a comparison may be accomplished by using a hash or partial hash of the user's key wallet password, or the like. In different embodiments, the key wallet application may report incorrect passwords half the time, one-quarter the time, or any other frequency desired. Further, the key wallet application may report incorrect passwords that only include typographic error derivations of the password, or the like.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer program product for a client computing system including a processor includes:
   code that directs the processor to request a challenge from an authentication server;
   code that directs the processor to receive the challenge from the authentication server via a secure communications channel, wherein the challenge includes at least a password that is inactive;
   code that directs the processor to receive user authentication data from a user;
   code that directs the processor to determine a private key and a digital certificate in response to the user authentication data;
   code that directs the processor to form a digital signature in response to the password that is inactive from the authentication server and the private key;
   code that directs the processor to communicate the digital signature to the authentication server,
   code that directs the processor to communicate the digital certificate to the authentication server, the digital certificate comprising a public key in an encrypted form; and
   code that directs the processor to communicate network user authentication data and the password that is inactive to the authentication server via a security server,
   wherein the authentication server activates the password that is inactive when the digital signature is verified, and
   wherein the codes reside on a tangible media.

2. The computer program product of claim 1 wherein the password that is inactive remains inactivate when the authentication server does not verify the digital signature.

3. The computer program product of claim 1 wherein the security server comprises a server selected from a group of servers consisting of: firewall server, VPN gateway server.

4. The computer program product of claim 1 wherein code that directs the processor to determine the private key and the digital certificate in response to the user authentication data comprises code that directs the processor to determine a private key associated with the user when the user authentication data is correct.

5. The computer program product of claim 4 wherein code that directs the processor to determine the private key and the digital certificate in response to the user authentication data further comprises code that directs the processor to determine a private key not associated with the user when the user authentication data is incorrect.

6. The computer program product of claim 1 further comprising code that directs the processor to receive network user authentication data from the user.

7. The computer program product of claim 1 wherein code that directs the processor to receive user authentication data from a user comprises code that directs the processor to receive user authentication data and the network authentication data from the user.

8. A client computing system for communicating with a private server includes:
   a tangible memory configured to store a key wallet, the key wallet including a private key associated with a user and a digital certificate associated with the user, the private key and digital certificate stored in an encrypted form;
   a processor coupled to the tangible memory, the processor configured to receive a challenge from an authentication server via a secure communications channel, the challenge comprising a password that is inactive, configured to receive user authentication data from the user, configured to determine a retrieved private key and a retrieved digital certificate from the key wallet in response to the user authentication data from the user; configured to form a digital signature in response to the password that is inactive from the authentication server and the retrieved private key, configured to communicate the digital signature to the authentication server, configured to communicate the digital certificate to the authentication server, and configured to communicate network user authentication data and the identity code to the authentication server via a security server,
   wherein the authentication server activates the password that is inactive when the digital signature is verified, and
   wherein the security server allows the client computing system to communicate with the private server when the password that is inactive is activated.

9. The client computing system of claim 8 wherein the retrieved private key and the private key associated with the user are identical.

10. The client computing system of claim 8
    wherein the retrieved private key and the private key associated with the user are different, and
    wherein when the retrieved private key and the private key associated with the user are different the identity code remains inactive.

11. The client computing system of claim 8 wherein the security server comprises a server selected from a group of servers consisting of: firewall server, VPN gateway server, electronic mail server, web server, database server, database system, application server.

12. The client computing system of claim 8 wherein the tangible memory can be removed from the client computer.

13. The client computing system of claim 8 wherein the processor is also configured to receive the network user authentication data from the user.

14. The client computing system of claim 8
    wherein the password that is inactive is determined in the authentication server, and
    wherein the password that is inactive is not stored on the client computing system before receiving the challenge from the authentication server.

15. A client system for communicating with a remote server includes:
    a tangible memory configured to store key wallet program, the key wallet program configured to store a private key associated with a user and a digital certificate associated with the user in protected forms;
    means for receiving a challenge from a verification server via a secure communications channel, the challenge comprising at least a network password that is inactive;
    means for receiving at least a PIN from the user;
    means for determining a returned private key and a returned digital certificate from the key wallet in response to at least the PIN from the user;
    means for forming a digital signature in response to the network password received from the verification server and to the private key;
    means for communicating the digital certificate and the digital signature to the authentication server; and
    means for communicating at least the network password to a security server,
    wherein the network password is activated when the digital signature and digital certificate authenticate the user; and
    wherein the security server allows the client system to communicate with the remote server when the network password is activated.

16. The client system of claim 15 wherein the returned private key and the private key associated with the user are the same.

17. The client system of claim 16
    wherein the means for determining a returned private key comprises means for determining the returned private key in response to the PIN from the user, and a pre-determined PIN, wherein when the PIN from the user and the pre-determined PIN are different, the returned private key is different from the private key associated with the user, wherein when the PIN from the user and the pre-determined PIN are the same, the returned private key is the private key associated with the user;
    wherein when the returned private key and the private key associated with the user are different the digital signature and the digital certificate do not authenticate the user.

18. The client system of claim 15 further comprising means for receiving at least a network password associated with the user from the user,
    wherein the means for communicating the digital certificate and the digital signature to the authentication server also comprise means for communicating the network password associated with the user to the authentication server.

19. The client system of claim 15 wherein the means for communicating the digital certificate and the digital signature to the authentication server also comprise means for communicating a network password associated with the user to the authentication server;

the client system further comprising means for determining the network password associated with the user in response to at least the PIN from the user.

20. The client computing system of claim 15 wherein the client computing system is selected from a group of devices consisting of: desktop computer, portable computer, PDA, wireless device.

* * * * *